3,632,676
POLYMER COMPOSITIONS
Joseph Michael Schmitt, Ridgefield, and Charles William Deeley, Fairfield, Conn., assignors to American Cyanamid Company, Stamford, Conn.
No Drawing. Filed June 5, 1969, Ser. No. 830,878
Int. Cl. C08f 41/12, 19/10
U.S. Cl. 260—876 R    9 Claims

ABSTRACT OF THE DISCLOSURE

Molding compositions comprising (A) a hard, resinous terpolymer comprising (1) from about 67–72 parts of methyl methacrylate, (2) 18–22 parts of styrene and (3) 8–12 parts of a monomer having the formula (I) 

wherein R is CN, CONH$_2$ or CONHR′, or a monomer having the formula (II) 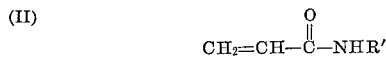

wherein R′ is an alkyl group of 3–8 carbon atoms attached to the nitrogen atom via a secondary or tertiary carbon atom, and (B) polybutadiene grafted with (a) from about 67–80 parts of methyl methacrylate, (b) 17–21 parts of styrene and (c) 1–13 parts of acrylonitrile or (3), above, the ratio of polybutadiene to monomer in (B) ranging from about 2:1 to about 3:1, respectively, the amount of (B) in said composition ranging from about 5% to about 30% expressed as polybutadiene exclusive of grafted monomers and the amount of (A) being such as to total 100% with the content of grafted polybutadiene, are disclosed.

BACKGROUND OF THE INVENTION

It is well known in the art to prepare thermoplastic compositions utilizing blends of various polymers and rubber latices. Compositions of this type have been prepared by various methods. In addition, copolymers of methacrylic acid esters have been blended with butadiene-styrene polymers and polybutadiene latices by various and sundry methods. Although the compositions shown in the prior art possess high impact strengths, clarity etc., they do not possess the unique combination of properties of the instant compositions. That is to say, while prior art compositions individually may possess one or two desirable properties, the compositions fail to exhibit properties usually considered necessary and therefore are not suited for the uses for which the instant compositions have been found applicable.

More particularly, U.S. Pat. No. 3,354,238 discloses an improved molding composition comprising a blend of (1) a resinous terpolymer of methyl methacrylate, styrene and acrylonitrile and (2) polybutadiene grafted with methyl methacrylate, styrene and acrylonitrile.

SUMMARY

We have now found that replacement of the acrylonitrile monomer in the resinous terpolymer phase of the compositions disclosed in the above-identified patent by a monomer represented by Formula I or II, above, results in molding compositions having an unexpectedly higher heat distortion temperature.

A high heat distortion temperature is important because many steps in the packaging of various products require the use of heat. One such operation is the filling of jars and bottles etc. with products which have been freshly prepared and are therefore still at a high temperature. Additionally, many products must be packaged while hot in order that their freshness, consistency etc. is maintained at a desired level. Since many thermoplastic packaging materials cannot survive such conditions of packaging and therefore are unsuitable for such applications, the utilization of our novel compositions in the production of, for example, blow-molded bottles, enables the ultimate consumer of the bottles to capitalize on the higher heat distortion thereof in the packaging of products therein.

Our novel compositions therefore satisfy a long-felt need of industry in that they combine all the attractive features of commercially available packaging materials i.e. transparency, high impact strength, water-white color and surface gloss with an increased heat distortion temperature which enables them to be utilized in packaging as indicated above.

DESCRIPTION OF THE INVENTION INCLUDING PREFERRED EMBODIMENTS

Our compositions are produced by blending a resinous terpolymer produced by any known procedure, with a grafted polybutadiene. The polymerization of the terpolymer of methyl methacrylate, styrene and a compound represented by Formulae I or II, above, may be conducted in the presence of a free radical-generating catalyst, e.g. benzoyl peroxide and a polymerization regulator, at a temperature of from about 10° C. to 120° C. Generally the water-soluble, as well as the monomer-soluble, types of catalysts may be employed in amounts ranging from about 0.05 to 5.0 parts, by weight, of the monomers employed.

Emulsion polymerization processes may be employed, and any available emulsifier may be used, with compounds such as fatty acid soaps, rosin soaps, sodium lauryl sulfate, nonionic emulsifiers such as polyethoxy alkylated phenols, compounds such as dioctyl sodium sulfosuccinate and the like, in amounts ranging from about 1% to 8%, by weight, preferably 4% to 5%, by weight, based on the amount of monomers employed, being exemplary.

Polymerization regulators may be used, with compounds such as the organic sulfur compounds, i.e. the thio acids, mercaptans such as benzyl mercaptan, aliphatic mercaptans possessing at least 6 carbon atoms such as octyl, dodecyl and tertiary dodecyl mercaptan, mixtures of mercaptans, nitrohydrazine, amino compounds, carbon tetrachloride and any other well known polymerization modifier or regulator, being exemplary. It is preferred however, to use the alkyl mercaptans of low water solubility, such as dodecyl mercaptan, in amounts ranging from about 0.01% to 5.0%, by weight, based on the weight of the monomers employed.

The terpolymer must contain from 67–72 parts of methyl methacrylate, 18–22 parts of styrene and 8–12 parts of the compound of Formula I or II to achieve the properties mentioned above in the final composition when blended with the grafted rubber.

There may also be added to the terpolymer, after or during formation, such ingredients as light stabilizers, heat stabilizers, antioxidants, lubricants, plasticizers, pigments, fillers, dyes and the like, without detracting from the unique properties of our novel molding compositions.

The grafted polybutadiene employed as component (2) in our novel molding compositions may likewise be prepared by any known process, that described above in regard to the terpolymer being exemplary.

The polybutadiene must be grafted, with from about 67–80 parts of methyl methacrylate, 17–21 parts of styrene and 1–13 parts of acrylonitrile or any of the compounds of Formula I or II, above, to produce, when blended with the polymer, compositions having the above-mentioned unique combination of properties.

The polybutadiene to monomers ratio must range from about 2/1–3/1, respectively, and the polybutadiene must be present in the final composition in an amount ranging from about 5–30%.

The terpolymer and the grafted polybutadiene may be blended together to form our novel molding compositions, in any known manner, such as for example, utilizing a ball mill, hot rolls, emulsion blending and the like.

It is preferred, however, that the blending operation be carried out by preparing a stream of each of the components in a form enabling accurate metering of these components, e.g. a polymer solution and a rubbery latex, in proportions to produce the desired composition, to a devolatilizer-extruder where the two streams are mixed, compounded, devolatilized and extruded in a very short period of time as is succinctly described in the above-mentioned U.S. patent.

As can be seen, the compounds represented by Formula I or II must be present in the hard, resinous terpolymer phase of our novel compositions. They can also be used as a replacement of the acrylonitrile in the grafted polybutadiene phase of the compositions in conjunction with the replacement in the terpolymer phase. Such a substitution does not, however, cause an increase in the heat distortion temperature over that achieved by the replacement of the acrylonitrile in the resinous terpolymer phase alone. The use of acrylonitrile in the grafted polybutadiene phase is, therefore, still within the scope of the present invention.

Examples of monomers represented by Formula I and II, above, include methacrylonitrile, methacrylamide, isopropyl methacrylamide, t-butyl methacrylamide, N-isopropyl acrylamide, N-t-butyl acrylamide, N-1-methylheptyl acrylamide, N-1,1,3,3-tetramethylbutyl acrylamide, 1-methylheptyl methacrylamide, 1,1,3,3-tetramethylbutyl methacrylamide and the like.

These properties enable the compositions to be formed into articles of manufacture never before thought possible. For example, our compositions may be formed into blow molded, compression molded, vacuum formed, etc. articles useful for the storage or transportation of many commercial, industrial and household products.

The following examples are set forth for purposes of illustration only and should not be construed as limitations on the present invention except as set forth in the appended claims. All parts and percentages are by weight unless otherwise indicated.

EXAMPLE 1

18.7 parts of grafted polybutadiene rubber, in the form of a rubber latex at 50% solids, which is comprised of 3.0 parts of rubber and 1.0 part of graft polymerized methyl methacrylate, styrene and methacrylonitrile in a ratio of 78/19/3, respectively, are blended on a 2-roll mill with 81.3 parts of a terpolymer of 71/19/10 methyl methacrylate, styrene, methacrylonitrile. The properties of a sample produced from the resultant composition are as follows. Izod impact strength (notched): 2.0 f.p.p.i.; heat distortion temperature under load (264 p.s.i.) annealed: 95° C.; melt index: 1.7.

Following the procedure of Example 1, either methacrylonitrile is utilized with methyl methacrylate and styrene to produce terpolymers and grafted polybutadiene or various other monomers are substituted for the methacrylonitrile therein. All else remains equal except that 28 parts of grafted polybutadiene are used, the grafted rubber comprises 2.5 parts of rubber and 1 part of grafted monomers and 72 parts of the terpolymer are blended. The results are set forth in Table I, below.

TABLE I

| Ex. | Resinous terpolymer phase Monomer [1] | Inh. visc.[2] | Grafted polybutadiene phase Monomer [1] | Notched Izod impact strength (f.p.p.i.)[3] | Heat distortion temperature, ° C. (under load, 264 p.s.i.) Annealed | Unannealed | Rockwell hardness (R) |
|---|---|---|---|---|---|---|---|
| 2 | Methacrylonitrile | 0.40 | Methacrylonitrile | 2.85 | 86 | 83 | 112 |
| 3 | do | 0.53 | do | 2.80 | | 81 | |
| 4 | do | 0.58 | do | 2.68 | | 95 | 115 |
| 5 | t-Butyl-methacrylamide | 0.40 | t-Butyl-methacrylamide | 2.29 | 93 | 86 | 116 |
| 6 | do | 0.48 | do | 2.40 | | 91 | |
| 7 | Isopropyl acrylamide | | Isopropyl acrylamide | 2.28 | | 80 | 115 |
| 8 | Methacrylamide | 0.44 | Methacrylamide | 1.27 | | 94 | |

[1] Methyl methacrylate and styrene used therewith.
[2] Inherent viscosity in dimethyl formamide at 30° C., 0.5 g./100 ml.
[3] All test specimens injection molded; 5 x ½ x ¼ inches.

EXAMPLE 9

The procedure of Example 1 is again followed except that the methacrylonitrile in the grafted polybutadiene phase is replaced by a similar amount of acrylonitrile. The heat distortion temperature of the resultant material is 94° C.

What is claimed is:

1. A molding composition comprising a physical blend of (A) a hard, resinous terpolymer comprising (1) from about 67–72 parts of methyl methacrylate, (2) 18–22 parts of styrene and (3) 8–12 parts of a monomer having the formula

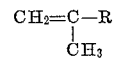

wherein R is $CN$, $CONH_2$ or $CONHR'$, or a monomer having the formula

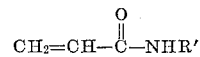

wherein R' is an alkyl group of 3–8 carbon atoms, inclusive, attached to the nitrogen atom via a secondary or tertiary carbon atom, and (B) polybutadiene grafted with (a) from about 67–80 parts of methyl methacrylate, (b) 17–21 parts of styrene and (c) 1–13 parts of acrylonitrile or (3), above, the ratio of polybutadiene to monomer in (B) ranging from about 2:1 to about 3:1, respectively, the amount of (B) in said composition ranging from about 5% to about 30% expressed as polybutadiene exclusive of grafted monomers and the amount of (A) being such as to total 100% with the content of grafted polybutadiene.

2. A composition according to claim 1 wherein (3) and (c) are methacrylonitrile.

3. A composition according to claim 1 wherein (3) and (c) are t-butyl methacrylamide.

4. A composition according to claim 1 wherein (3) and (c) are isopropyl acrylamide.

5. A composition according to claim 1 wherein (3) and (c) are methacrylamide.

6. A composition according to claim 1 wherein (3) is methacrylonitrile and (c) is acrylonitrile.

7. A composition according to claim 1 wherein (3) is t-butyl methacrylonitrile and (c) is acrylonitrile.

8. A composition according to claim 1 wherein (3) is isopropyl acrylamide and (c) is acrylonitrile.

9. A composition according to claim 1 wherein (3) is methacrylamide and (c) is acrylonitrile.

References Cited

UNITED STATES PATENTS

| | | | |
|---|---|---|---|
| 3,354,238 | 11/1967 | Schmitt et al. | 260—876 |
| 3,378,605 | 4/1968 | Baer | 260—876 |

FOREIGN PATENTS

| | | | |
|---|---|---|---|
| 713,635 | 7/1965 | Canada | 260—876 |

SAMUEL H. BLECH, Primary Examiner

H. ROBERTS, Assistant Examiner

U.S. Cl. X.R.

206—45.31; 260—80.73, 80.81, 880 R